(12) United States Patent
Biderman et al.

(10) Patent No.: US 10,382,830 B2
(45) Date of Patent: *Aug. 13, 2019

(54) TRICK PLAY IN DIGITAL VIDEO STREAMING

(71) Applicant: Apple Inc., Cupertino, CA (US)

(72) Inventors: David L. Biderman, San Jose, CA (US); Xiaosong Zhou, Campbell, CA (US); Douglas Scott Price, San Jose, CA (US); Yeping Su, Sunnyvale, CA (US); Chris Y. Chung, Sunnyvale, CA (US); Hsi-Jung Wu, San Jose, CA (US); Zhenheng Li, San Jose, CA (US); John Su, Sunnyvale, CA (US); James D. Batson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 15/296,156

(22) Filed: Oct. 18, 2016

(65) Prior Publication Data

US 2017/0041681 A1   Feb. 9, 2017

Related U.S. Application Data

(63) Continuation of application No. 13/941,174, filed on Jul. 12, 2013, now Pat. No. 9,508,390.

(51) Int. Cl.
*H04N 21/61*  (2011.01)
*G06K 9/00*  (2006.01)
(Continued)

(52) U.S. Cl.
CPC ..... *H04N 21/6125* (2013.01); *G06K 9/00718* (2013.01); *G11B 27/005* (2013.01);
(Continued)

(58) Field of Classification Search
USPC .................................. 386/343–352
See application file for complete search history.

(56) References Cited

U.S. PATENT DOCUMENTS

| 9,087,508 B1* | 7/2015 | Dzik ..................... G10L 21/057 |
| 2003/0156824 A1* | 8/2003 | Lu ........................ G11B 27/105 |
| | | 386/230 |

(Continued)

FOREIGN PATENT DOCUMENTS

| CN | 1794798 A | 6/2006 |
| CN | 101193298 A | 6/2008 |

(Continued)

OTHER PUBLICATIONS

Shu et al.; "Dynamic frame-skipping transcoding with motion information considered"; IET Image Processing; vol. 1 Issue 4; Dec. 2007; p. 335-342.

*Primary Examiner* — Hung Q Dang
(74) *Attorney, Agent, or Firm* — BakerHostetler

(57) ABSTRACT

System and methods for improved playback of a video stream are presented. Video snippets are identified that include a number of consecutive frames for playback. Snippets may be evenly temporally spaced in the video stream or may be content adaptive. Then the first frame of a snippet may be selected as the first frame of a scene or other appropriate stopping point. Scene detection, object detection, motion detection, video metadata, or other information generated during encoding or decoding of the video stream may aid in appropriate snippet selection.

20 Claims, 8 Drawing Sheets

(51) Int. Cl.
  *H04N 21/262*    (2011.01)
  *H04N 21/845*    (2011.01)
  *H04N 21/6587*   (2011.01)
  *H04N 21/4402*   (2011.01)
  *G11B 27/30*     (2006.01)
  *G11B 27/00*     (2006.01)

(52) U.S. Cl.
  CPC ....... *G11B 27/3081* (2013.01); *H04N 21/262* (2013.01); *H04N 21/440281* (2013.01); *H04N 21/6587* (2013.01); *H04N 21/8456* (2013.01); *G06K 2009/00738* (2013.01)

(56) References Cited

U.S. PATENT DOCUMENTS

| | | |
|---|---|---|
| 2005/0060757 A1 | 3/2005 | Suh |
| 2006/0140580 A1 | 6/2006 | Hiroi et al. |
| 2010/0077435 A1 | 3/2010 | Kandekar et al. |

FOREIGN PATENT DOCUMENTS

| | | |
|---|---|---|
| CN | 102124727 A | 7/2011 |
| EP | 1748438 A1 | 1/2007 |
| EP | 1806919 A1 | 7/2007 |
| EP | 1926103 A2 | 5/2008 |
| JP | H10-112835 A | 4/1998 |
| JP | 2002-010259 A | 1/2002 |
| JP | 2002-125174 A | 4/2002 |
| JP | 2004-328218 A | 11/2004 |
| JP | 2005-109986 A | 4/2005 |
| JP | 2005-286881 A | 10/2005 |
| JP | 2008-153955 A | 7/2008 |
| JP | 2008-193285 A | 8/2008 |
| JP | 2009-522887 A | 6/2009 |
| JP | 2010-093614 A | 4/2010 |

* cited by examiner

100

200

300

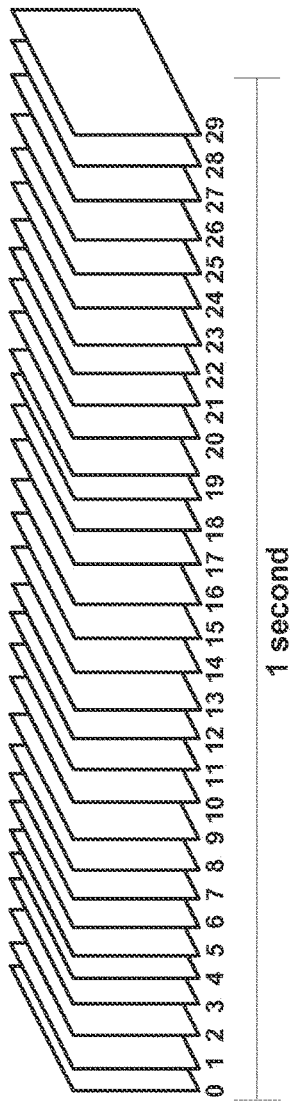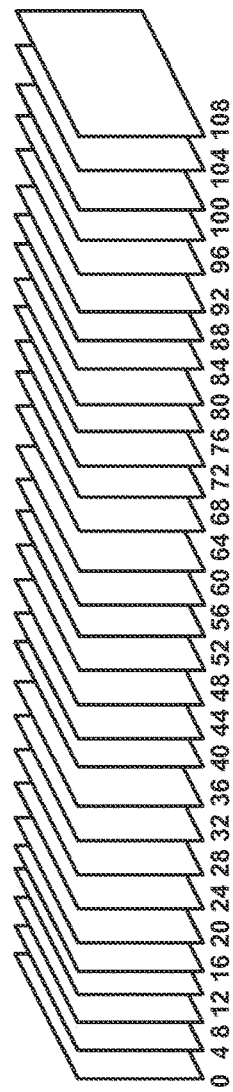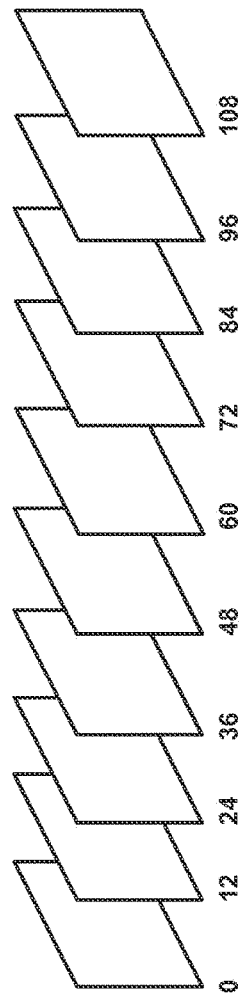
FIG. 4(A)
400
FIG. 4(B)
410
FIG. 4(C)
420
Prior Art

500

510

520

530

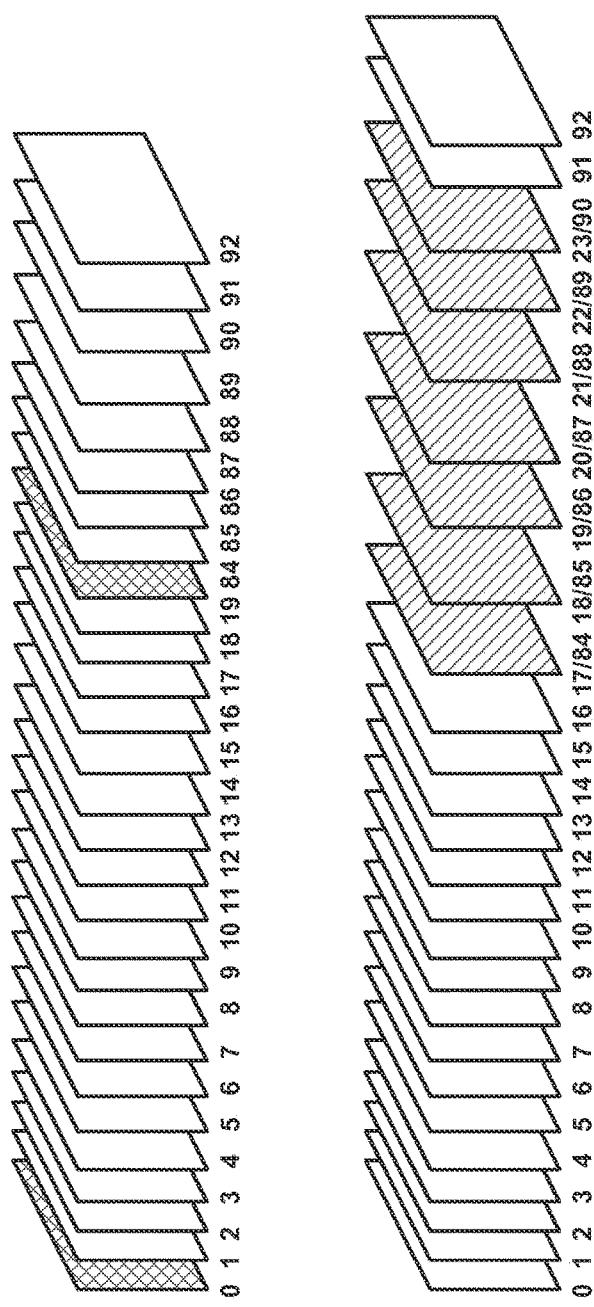
FIG. 6(A)
600
FIG. 6(B)
610
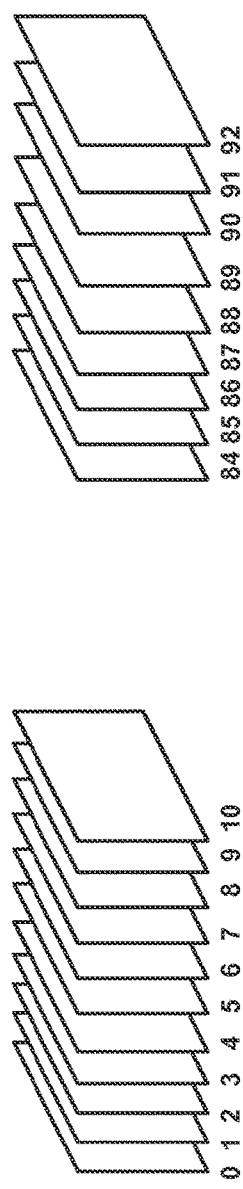
FIG. 6(C)
620

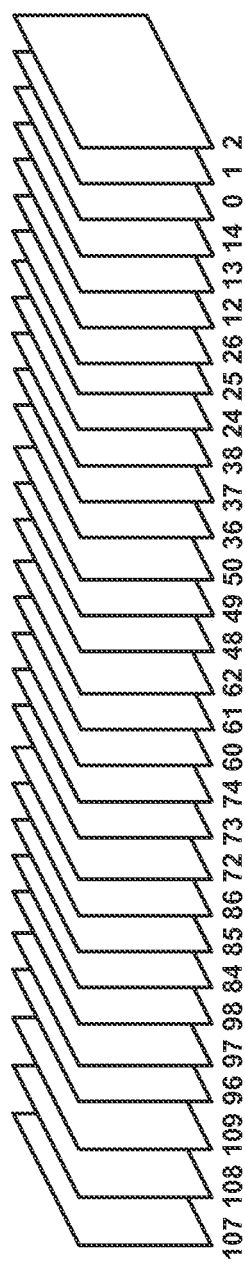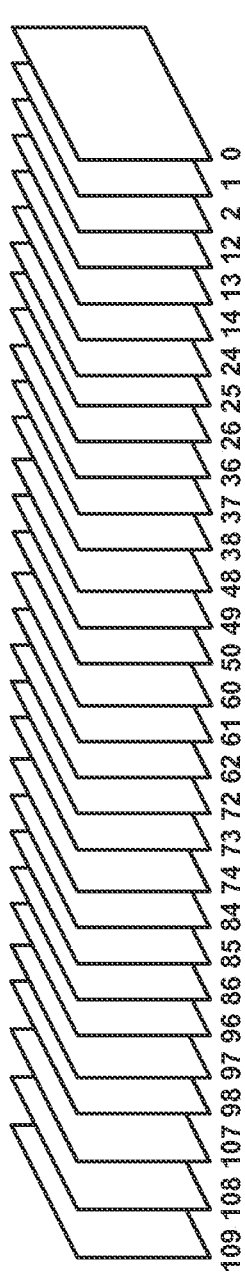
FIG. 7(A) 700
FIG. 7(B) 710

800

TRICK PLAY IN DIGITAL VIDEO STREAMING

CROSS REFERENCE TO RELATED APPLICATION

This patent application is a Continuation of and claims priority of filing date of U.S. patent application Ser. No. 13/941,174 entitled "TRICK PLAY IN DIGITAL VIDEO STREAMING," which is incorporated by reference in its entirety herein.

BACKGROUND

Aspects of the present invention relate generally to the field of video display, and more specifically to optimizing playback of video content displayed on an end user device.

When navigating audio and video content on a display device, certain playback modes allow the user to fast forward or rewind the video content at predetermined speeds. One of the problems with navigating through video content is that it can be difficult to press play at precisely the moment intended, such that playback will resume at the desired location in the video stream. Additionally, conventional playback modes will often display frames at the same frame rate as the normal playback, during which the fast forward playback mode may result in a video sequence that has flickering and that is difficult to see or understand. Alternatively, conventional playback modes will often display fewer frames at a slower frame rate to avoid flicker. However, the larger jumps between frames may jump the frames that contain the desired stopping point.

Accordingly, there is a need in the art for systems and methods to display video data in a more user-friendly manner during fast forward and rewind playback modes.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

FIGS. 4(A)-(C) illustrate conventional playback modes for a subset of frames of video data.

FIGS. 6(A)-(C) illustrate exemplary playback modes according to embodiments of the present invention.

FIGS. 7(A)-(B) illustrate exemplary rewind playback modes according to embodiments of the present invention.

DETAILED DESCRIPTION

In the disclosed embodiments, video frames are subsampled for improved playback. Instead of playing back one isolated frame at a time, a number of consecutive or closely spaced frames are played back. Then playback can be at a higher frame rate without causing flickering. In this way, a viewer will see consecutive motion, which is a more pleasant experience and makes it easier for the viewer to recognize the content.

The playback of a video sequence may be determined by first identifying snippets for display. A snippet begins with a first frame selected for display followed by several frames selected from the video stream following the first selected frame in playback order. The snippets may be evenly spaced in the video stream.

The snippet selection may also be content adaptive. Then the first frame of a snippet may be selected as the first frame of a scene. Scene detection, object detection, and/or motion detection may aid in appropriate snippet selection. For example, given metadata about the boundaries between programs, combined with markers in the digital media that can be mapped to that metadata to select appropriate snippets, the playback experience may be optimized to display the content of the video data in a manner that allows the viewer to select a proper stopping point.

Scenes or video sequences may be skipped during playback if the content is of poor quality, if the number of frames in the scene is below a predetermined threshold, if the motion detected in the sequence is too high to form a meaningful snippet, etc.

According to an embodiment, the first frame of a video snippet or the last frame of a video snippet may be displayed for a slightly longer amount of time. This offers the user a wider range of time for them to hit play and land on the exact spot they intend.

Figure 1:
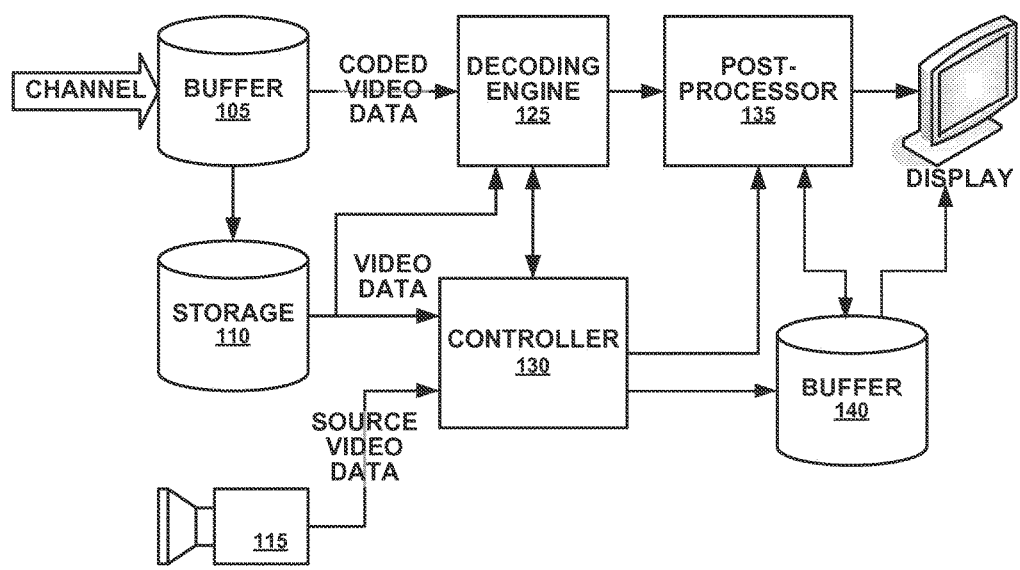
FIG. 1 is a simplified block diagram illustrating components of an exemplary video display device according to an embodiment of the present invention.

FIG. 1 is a simplified block diagram illustrating components of an exemplary video display device 100 according to an embodiment of the present invention. As shown in FIG. 1, the display device 100 may receive video data from a channel, from local storage 110, as source video captured by a camera 115, or from another video communication method, for example, via a satellite connection or television cable provider (not shown). Coded video data may be coded according to a predictive coding technique or other known coding methods. For video data received from a channel, the display device 100 includes a buffer 105 to receive and store the channel data.

As shown in FIG. 1, to process video data, the display device 100 further includes a decoding engine 125 to receive coded video data and to decode the coded video data by inverting the coding processes performed during encoding of the video data, a controller 130 to identify the characteristics of the coded video data, to select a decoding mode for the coded video data, and to manage display of the video, and a post-processor 135 that further processes the video to prepare it for display. Post-processing operations may include filtering, de-interlacing, scaling or performing other processing operations on the video data that may improve the quality of the video displayed. The video data is then displayed on a screen or other display.

Additionally, the controller 130 and/or post processor 135 may prepare and manage the playback of the video data during fast-forward, rewind, or other trick playback modes. Such preparation may include creation of an alternate stream having selected or altered frames that will be displayed during an alternate playback mode. The display device 100 may contain a buffer 140 for storing sequences of altered video data to display the video according to the playback modes described herein. Additionally, an alternate as described herein that was previously created may be stored with the video data in local storage 110 or received with the video data over the channel or other communication streams.

Figure 2:
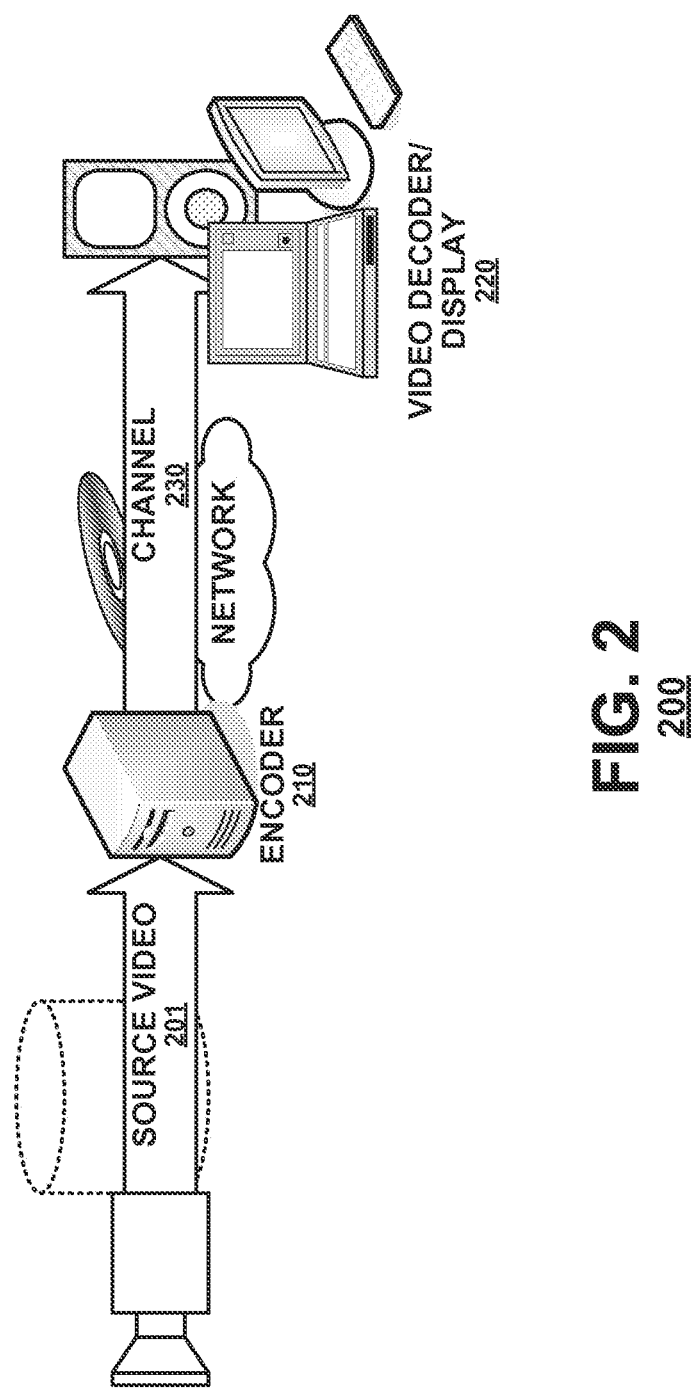
FIG. 2 is a simplified block diagram illustrating components of an exemplary video communication system according to an embodiment of the present invention.

FIG. 2 is a simplified block diagram illustrating components of an exemplary video communication system 200 according to an embodiment of the present invention. As shown in FIG. 2, an exemplary video coding system may include an encoder system 210 and a decoder system 220 provided in communication via a channel 230. The encoder system 210 may accept source video 201 and may code the source video 201 as coded video. The encoder system 210 may output the coded video data to the channel 230, which may be a storage device, such as an optical, magnetic or electrical storage device, or a communication channel formed by a computer network or a communication network.

The decoder system 220 may retrieve the coded video data from the channel 230, invert the coding operations performed by the encoder system 210 and output decoded video data to an associated display device. Video display devices may include televisions, personal computers (both desktop and laptop computers), tablet computers, handheld computing devices, media players, dedicated video conferencing equipment, etc. As shown, the system 200 supports video coding and decoding in one direction only. However, according to an embodiment, video may be captured at each terminal and bidirectional communication may be achieved with an encoder and a decoder implemented at each terminal.

Figure 3:
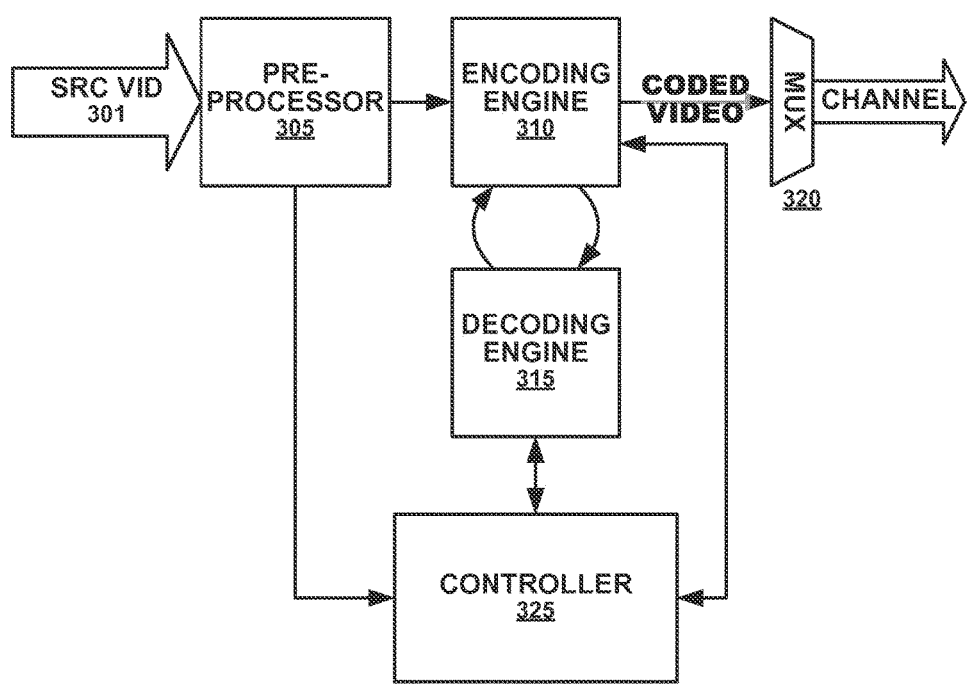
FIG. 3 is a simplified block diagram illustrating components of an exemplary encoder according to an embodiment of the present invention.

FIG. 3 is a simplified block diagram illustrating components of an exemplary encoder 300 according to an embodiment of the present invention. As shown in FIG. 3, the encoder 300 may include a pre-processor 305, a coding engine 310, a decoding engine 315, a multiplexer 320, and a controller 325. The encoder 300 may receive an input source video sequence 301 from a video source such as a camera or video storage. The pre-processor 305 may process the input source video sequence 301 as a series of frames and condition the source video for more efficient compression. For example, the image content of an input source video sequence may be evaluated to determine an appropriate coding mode for each frame. The pre-processor 305 may additionally perform video processing operations on the frames including filtering operations such as de-noising filtering, bilateral filtering or other kinds of processing operations that improve efficiency of coding operations performed by the encoder 300.

A conventional encoder may code a source video sequence 301 into a coded representation that has a smaller bit rate than does the source video and, thereby achieve data compression. The coding engine 310 may receive the processed video data from the pre-processor 305 and generate compressed video. One common technique for data compression uses predictive coding techniques (e.g., temporal/motion predictive encoding). For example, some frames in a video stream may be coded independently (I-frames) and some other frames (e.g., P-frames or B-frames) may be coded using other frames as reference frames. P-frames may be coded with reference to a single previously-coded frame (P-frame) and B-frames may be coded with reference to a pair of previously-coded frames, typically a frame that occurs prior to the B-frame in display order and another frame that occurs subsequently to the B-frame in display order.

The coding engine 310 may operate according to a predetermined multi-stage protocol, such as H.263, H.264, or MPEG-2. The coded video data, therefore, may conform to a syntax specified by the protocol being used. The coding engine may additionally select from or be assigned one of a variety of coding modes to code the video data, where each different coding mode yields a different level of compression, depending upon the content of the source video. For example, the coding engine 310 may parse source video frames according to regular arrays of pixel data (e.g., 8×8 or 16×16 blocks), called "pixel blocks" herein, and may code the pixel blocks according to block prediction and calculation of prediction residuals, quantization and entropy coding.

The encoder 300 may further include a decode engine 315 that decodes the coded pixel blocks output from the coding engine 310 by reversing the coding operations performed therein. The decoding engine 315 may generate the same decoded replica of the source video data that a decoder system will generate, which can be used as a basis for predictive coding techniques performed by the coding engine 310. The decoding engine 315 may access a reference frame cache to retrieve reference data for decoding and to store decoded frame data that may represent sources of prediction for later-received frames input to the video coding system.

The coded frames or pixel blocks may then be output from the coding engine 310 and stored by the MUX 320 where they may be combined into a common bit stream to be delivered by the transmission channel to a decoder, terminal, or data storage. To recover the video data, the bitstream may be decompressed at the decoder, by inverting the coding processes performed by the encoder, yielding a received decoded video sequence.

According to an aspect of an embodiment, during the encoding process, an encoder 300 may identify scene changes or other information relevant to adjusting the playback of the video data as described herein. For example, the pre-processor 305 or controller 325 may capture this information during the encoding process described above. Such information captured or created by the encoder may then be stored with the encoded video and/or transferred to a decoder for decoding and processing. In an embodiment, the encoder 300 may transmit playback information with the coded frames for a sequence of video data in logical channels established by the governing protocol for out-of-band data. As one example, used by the H.264 protocol, the encoder 300 may transmit playback information in a supplemental enhancement information (SEI) channel specified by H.264. In such an embodiment, the MUX 320 represents processes to introduce the playback information in a logical channel corresponding to the SEI channel. When the present invention is to be used with protocols that do not specify such out-of-band channels, the MUX 320 may establish a separate logical channel for the playback information within the output channel.

According to an aspect of the embodiment, the encoder 300 may additionally create an alternate stream containing snippets of video data that will be displayed during various playback modes. This alternate stream may be separately encoded and transmitted with or stored with the encoded stream of source video data and accessed during trick play.

FIGS. 4(A)-(C) illustrate conventional playback modes for a subset of frames of video data. In FIG. 4(A), the sequence of frames 400 including frames 1-30 may represent a scene, a sequence of frames, a group of pictures, or other subset of a stream of video data. Then as shown in FIG. 4(A), during normal playback, frames 1-30 may be played in order at a playback rate, for example, 30 frames per second (fps).

Conventionally, various fast forward or rewind playback rates will sample the frames of the video data at the same playback rate (FIG. 4(B)) or at a different playback rate, e.g., 10 fps (FIG. 4(C)). As shown in FIG. 4(B), a 4× fast forward playback mode at 30 fps may result in a video sequence 410 that has flickering and that is difficult to see or understand. As shown in FIG. 4(C), a conventional 4× fast forward playback mode may reduce the frame rate to 10 fps resulting in a video sequence 420 with improved visibility for the frames that are displayed but displaying fewer frames and thereby potentially jumping appropriate stopping points.

Figure 5A:
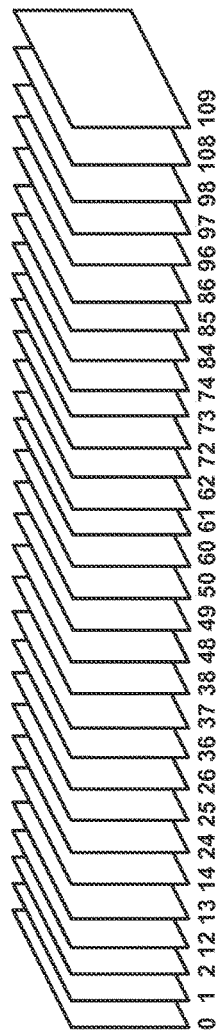
FIGS. 5(A)-(D) illustrate exemplary playback modes having fixed intervals for playback according to embodiments of the present invention.
Figure 5B:
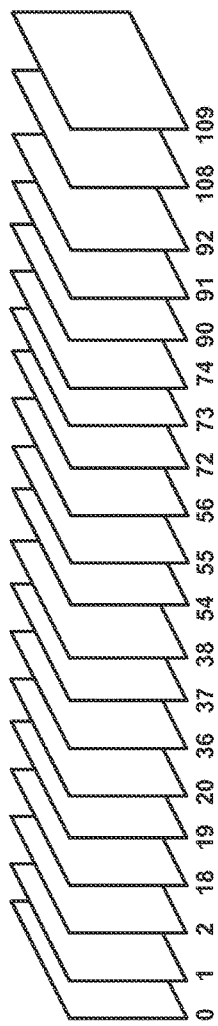

According to an embodiment, a fast forward playback mode will display multiple sequential frames before jumping forward to another frame. FIGS. 5(A)-(B) illustrate exemplary playback modes according to an embodiment of the present invention. As shown in FIG. 5(A), a video sequence 500 displayed with a 4× playback speed will display a predetermined number of sequential frames in playback order at each jump. For example, as shown in FIG. 5(A), the snippet containing frames 0-2 is initially displayed, then a snippet containing frames 12-14, then frames 24-26, etc. In this manner, the playback mode will maintain a 4× playback speed with 30 fps displayed. Displaying consecutive motion at each jump allows the viewer to acquire an understanding of the content while avoiding the flickering that is problematic in conventional playback at higher playback rates.

According to an aspect of an embodiment, the initial frame of the snippet may be displayed for a longer period of time, thereby ensuring the viewer has time to see that a new snippet is being displayed and to identify the content of the snippet.

When a user indicates that the fast forward playback should stop, for example, with a remote or other input device, the display device may display a predetermined number of frames prior to the indicated stop point, frames representing a predetermined amount of time of the video sequence prior to the indicated stop point, from the beginning of the scene the user stopped at, or from the point at which the user indicated the fast forward playback should stop.

It will be understood that the predetermined number of frames may be altered, for example to display 5 or 6 sequential frames in each snippet or the fixed spacing between each jump may be altered. Then to maintain the speed of playback (e.g. 4×), the distance between frames or snippets, or the number of frames in a snippet may be altered as necessary.

Figure 5C:
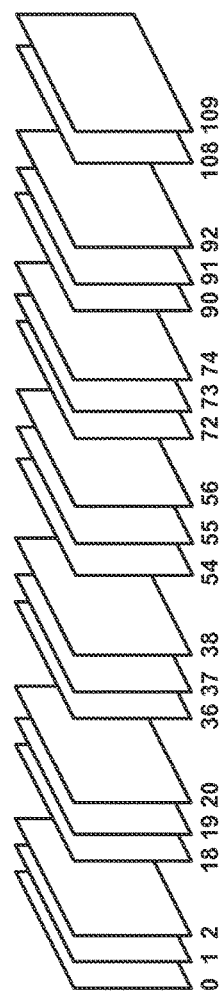

Similarly, the playback frame rate of video snippets may be altered, for example, the playback frame rate may be adaptively altered based on the content of the video data. As shown in FIG. 5(B), a video sequence 510 is displayed with a 4× playback speed at a 20 FPS rate. Alternatively, the sequential frames may be displayed at the standard playback rate (i.e. 30 fps) with a longer transition to the next group of frames to be displayed. This alternate playback mode is illustrated in video sequence 520 as shown in FIG. 5(C).

Figure 5D:
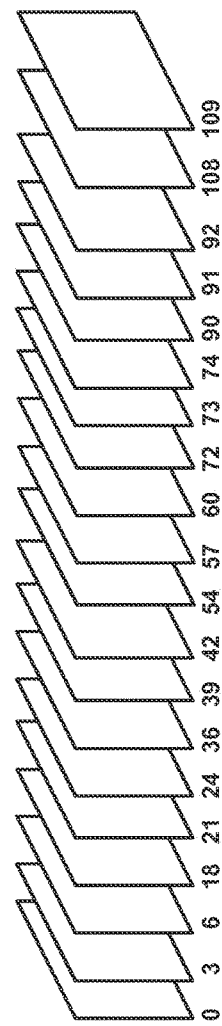

According to an aspect of an embodiment, the temporal spacing of the previously identified frames may be content adaptive. FIG. 5(D) illustrates a video sequence 530 that will be displayed with content adaptive frame timing. In FIG. 5(D), for a sequence of frames exhibiting low motion, the sub-sampled sequence will include closely spaced but not consecutive frames for display. An exemplary sequence is shown in FIG. 5(D). Low motion sequences may be detected by any conventional method of motion analysis, for example, with reference to local and/or global motion cues.

For example, frames that have the best prediction based on the stored reference frames may have little motion, high motion frames may have little correlation with stored reference frames.

According to an aspect of an embodiment, jumps between snippets during playback may not occur at fixed intervals. For example, the frames displayed during playback may be chosen based on their content. As shown in FIG. 6(A), during playback of a video sequence 600, each snippet begins at the start of a scene. In sequence 600, a scene begins at each of the shaded frames (i.e. at frames 0 and 84). Then consecutive motion may be displayed at the start of each scene before jumping to the next scene.

Scene changes may be detected by any conventional method of scene detection. For example, during encoding, the encoder may enter a flag or other indicator of a detected scene. Alternatively, a scene change may be detected at a decoder when an intra-coded (I-Frame) is detected or another known detection method.

Detected scenes and other snippet starting frames may be identified and organized into a hierarchy to aid in the creation of a playback stream at various speeds. For example, major scenes changes may be identified. Major scene changes may include transitions between a commercial program and a primary program, or other identifiable changes in the video content. Then less significant or minor scene changes may be identified. For example, changes between speakers or locations in video content. Once a hierarchy of scenes is identified, such a hierarchy may be stored with the video data and accessed when a display device is required to display video content in an alternate playback mode. Then for lower speed playback, both the major and minor scene changes may be identified as snippet starting points. However, in high speed playback, only the snippets corresponding to major scenes may be displayed.

Other methods of snippet selection may be considered based on the content type of the video. For example, for movies or television shows, frame interval selection may be based on conventional scene detection as described above. However, for sports programs, intervals may be selected based on possession changes, score changes, each play, etc. Such content may be detected with an analysis of the video image content. As an example, a score change may be detected by identifying changes in the portions of a frame that represent a scoreboard or by detecting a change in the direction of motion which may represent a change in possession. Similarly for news programs, snippets may be set to start at the transitions between each news segment.

Audio clues may additionally aid in identifying snippet starting points. For example, an increase in sound representing an audience cheering may indicate a score change.

Other information conventionally available with video data prepared for display, or created during encoding or decoding, may be used for snippet identification. For example, closed caption information may indicate when a conversation begins or ends, when a new character is speaking, etc. Additionally, object detection and related information may provide clues as to the contents of and/or changes in a scene. Snippets also may be preferred if they are whole with respect to video or audio content and selected accordingly. Other metadata associated with the video data may also provide information relevant for identifying where a snippet should begin. For example, the creation time or other time stamp information for the video may indicate that a sequence of video data was created separately from a neighboring sequence. Such a feature may be particularly useful for identifying commercials within a movie or television program video stream.

According to an aspect of an embodiment, video received at the display device may include a playlist or manifest that represents a timeline for the video stream. For example, a manifest may identify complete segments of video data. The provider of the video stream may have authored the manifest to identify segments. Such a manifest is common with cable television and may allow for efficient alterations of the video stream without compromising the main content. For example, the manifest allows local stations to insert local commercials into the video stream. Snippets may then be selected to coincide with the segments identified in the manifest.

Snippets may alternatively be set to skip over less significant sequences of video. For example, a sequence of video that is poorly shot, was captured with poor lighting, or otherwise has limited significant content, may be skipped during fast forward playback without displaying any frames from the sequence. Such a feature may be particularly useful for user created mobile video or other user captured images. Alternatively, a less significant sequence may be identified by the size of the sequence. For example, if a scene is detected that has a limited number of frames, below a predetermined threshold for example, then that sequence may be skipped during playback.

According to an aspect of an embodiment, video data captured by a user may include preset snippets. During the video creation or editing, the user may mark frames as snippet starting points. Then during fast forward playback, the snippets may start at each marked frame.

According to an aspect of an embodiment, frames at a snippet transition may be blended to create a fade effect. As shown in FIG. 6(B), during playback of a video sequence 610, multiple frames preceding and following the snippet start may be combined to create a fade effect. Other effects may similarly be implemented between snippets. For example, using image-processing, the transitions between snippets or detected scenes may be smoothed such that the transition is clearer. Additionally, page turn or other visual effects may be implemented at the transition between snippets to make the transition more visible to the viewer. Such effects will make it clear to the user that they are in a fast forward mode and will make the scene transitions more apparent.

According to an aspect of an embodiment, frames at a snippet transition may be displayed for an extended period of time. As shown in FIG. 6(C), during playback of a video sequence 620, the display will pause on the last frame of the displayed sequence for a predetermined period of time. To achieve this effect, as shown in FIG. 6(C), the last frame of the interval (i.e. frame 10) may be displayed for an extended period of time. Alternatively, the last frame may be displayed repeatedly until the scene at the next snippet is displayed.

According to an aspect of an embodiment, an option for fast forward playback may include jumping directly to a last item or last snippet in the video stream. The last item may be content adaptive such that the last item may be the last scene change in a movie, the last possession in a ball game, the last joke in a comedy show, etc.

According to an aspect of an embodiment, a stream of video data having an altered sequence of frames representing a fast forward playback stream as described herein may be created during encoding and transmitted and/or stored with the video data at a video display device. Then the display device could access only those playback streams needed to display the appropriate snippets as described herein for the selected playback mode rather than the entire video stream. Alternatively, the altered sequence may be created at the display device, during decoding, post-processing, or during playback.

Although primarily described with reference to a fast forward functionality, the playback modes described herein may also be applicable during rewind. During rewind, the frames of a snippet displayed during playback may be displayed in a forward playback order as shown in sequence 700 of FIG. 7(A) or in a reverse playback order as shown in sequence 710 of FIG. 7(B).

Figure 8:
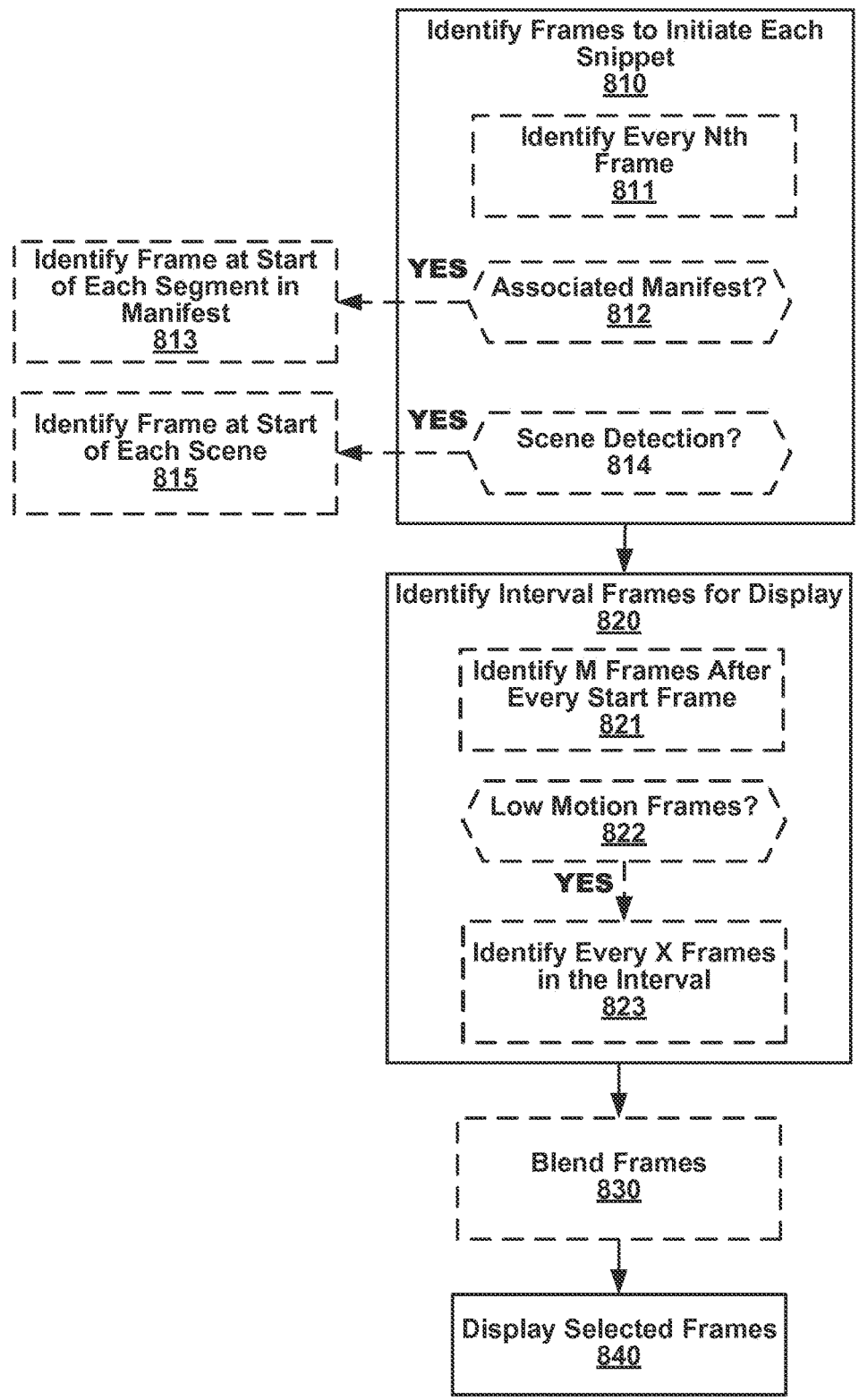
FIG. 8 illustrates an exemplary method for selecting frames for playback according to an embodiment of the present invention.

FIG. 8 illustrates an exemplary method 800 for selecting frames for playback according to an embodiment of the present invention. As shown in FIG. 8, to display a video stream in a fast forward or rewind mode, a controller may first select one or more frames that will start a new snippet (block 810). The frames may be selected to form snippets as described above. Exemplary options for selecting frames are shown in FIG. 8. For example, every Nth frame may be selected (block 811). Or, if a manifest associated with the video stream is present (block 812), a frame at the beginning of each segment identified in the manifest may be selected (block 813). Or if a method for scene detection is available (block 814), then a frame at the beginning of each detected scene may be selected (block 815). Other options for selecting frames to initiate a snippet, consistent with the embodiments described herein, may be implemented.

Then a controller may select frames after each previously selected starting frame to display (block 820). The frames may be selected to form snippets as described above. Exemplary options for selecting frames to form a snippet are shown in FIG. 8. For example, M consecutive frames after each start frame may be selected (block 821). It will be understood that in order to effectuate a fast forward display, M<N where N is the distance between frames at the start of two consecutive snippets. Or, if motion information for the frames in a video sequence is present, for low motion frames (block 822), a predetermined number of non-sequential frames, for example, every X frames, in the interval may be selected (block 823). The interval X can be adjusted adaptively based on content characteristics, for example, when a low motion scene is detected. Other options for selecting frames to form a snippet, consistent with the embodiments described herein, may be implemented According to an embodiment, frames at the end of a selected snippet and frames at the beginning of a next snippet may be blended to create a fade effect as described above (bock 830). Then, once frames for the snippet have been selected, the snippet may be displayed (block 840).

As discussed above, FIGS. 1-3 illustrate functional block diagrams of exemplary systems according to an embodiment of the present invention. In implementation, the systems may be embodied as hardware, in which case, the illustrated blocks may correspond to circuit sub-systems within the systems. Alternatively, the components of the systems may be embodied as software, in which case, the blocks illustrated may correspond to program modules within software programs. In yet another embodiment, the systems may be hybrid systems involving both hardware circuit systems and software programs.

Moreover, not all of the functional blocks described herein need be provided or need be provided as separate units. For example, although FIG. 1 illustrates the components of an exemplary system, such as the controller, decoding engine, and post-processor as separate units, in one or more embodiments, some or all of them may be integrated. Such implementation details are immaterial to the operation of the present invention unless otherwise noted above. Additionally, although FIG. 8 illustrates an exemplary method, the order of operations may be altered or some operations skipped entirely.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for displaying a stream of video data, comprising when a fast forward play mode is engaged:
    identifying a first plurality of frames from the stream of video data to be displayed during the fast forward play mode, the frames in the first plurality having a uniform temporal spacing from each other as determined by a rate of the fast forward play mode;
    for each respective frame in the first plurality, identifying a second plurality of frames from the stream in an interval between the respective frame and a next frame in the first plurality, wherein the second plurality of frames are consecutive with their respective first frame in regular playback mode; and
    displaying each first frame and its associated second plurality of frames at a normal playback rate.

2. The method of claim 1, wherein the displaying comprises:
    displaying at least one frame in the second plurality of frames at a snippet transition for an extended period of time, wherein a last frame of the second plurality of frames in an interval between the respective frame and the next frame in the first plurality is displayed for the extended period of time.

3. The method of claim 1, wherein the displaying comprises:
    displaying frames at a snippet transition for an extended period of time, wherein a last frame of the second plurality of frames in an interval between the respective frame and a next frame in the first plurality is displayed repeatedly for the extended period of time a subsequent snippet starting at the next frame in the first plurality is displayed.

4. The method of claim 1, further comprising:
    identifying a last snippet in the stream of video data; and
    displaying the last snippet in the stream of video data.

5. The method of claim 4, wherein the last snippet corresponds to a last scene change in the stream of video data.

6. The method of claim 1, wherein said first and second plurality of frames are created during an encoding of the stream of video data.

7. The method of claim 1, wherein said first and second plurality of frames are created during a decoding of the stream of video data.

8. A video display device comprising:
    a memory for storing video data;
    a controller configured to receive a request to display the video data at a fast forward play mode, and to select a snippet of the video data by:
    identifying a first plurality of frames in the video data to be displayed, the frames in the first plurality having a uniform temporal spacing from each other as determined by a rate of the fast forward play mode, and
    for each respective frame in the first plurality, identifying a second plurality of frames in the video data in an interval between the respective frame and a next frame in the first plurality, wherein the second plurality of frames are consecutive with its respective first frame in regular playback mode; and
    a display to display each first frame and its associated second plurality of frames of the selected snippet at a normal playback rate.

9. The video display device of claim 8, wherein the display is configured display at least one frame in the second plurality of frames at a snippet transition for an extended period of time, wherein a last frame of the second plurality of frames in an interval between the respective frame and the next frame in the first plurality is displayed for the extended period of time.

10. The video display device of claim 8, wherein the display is configured to display at least one frame in the second plurality of frames at a snippet transition for an extended period of time, wherein a last frame of the second plurality of frames in an interval between the respective frame and a next frame in the first plurality is displayed repeatedly for the extended period of time a subsequent snippet starting at the next frame in the first plurality is displayed.

11. The video display device of claim 8, wherein the controller is further configured to:
    identify a last snippet in the stream of video data; and
    display the last snippet in the stream of video data.

12. The video display device of claim 11, wherein the last snippet corresponds to a last scene change in the stream of video data.

13. The video display device of claim 8, wherein said first and second plurality of frames are created during an encoding of the stream of video data.

14. The video display device of claim 8, wherein said first and second plurality of frames are created during an encoding of the stream of video data.

15. A non-transitory computer readable medium storing program instructions that, when executed by a processing device, cause the processing device to, when a fast forward play mode is engaged:
    identify a first plurality of frames from the video stream to be displayed during fast forward play, the frames in the first plurality having a uniform temporal spacing from each other as determined by a rate of the fast forward play mode;

for each respective frame in the first plurality, identify a second plurality of frames from the video stream in an interval between the respective frame and a next frame in the first plurality, wherein the second plurality of frames are consecutive in regular playback mode; and display each first frame and its associated second plurality of frames at a normal playback rate.

16. The non-transitory computer readable medium of claim 15, wherein the processing device is caused to display at least one frame in the second plurality of frames at a snippet transition for an extended period of time, wherein a last frame of the second plurality of frames in an interval between the respective frame and the next frame in the first plurality is displayed for the extended period of time.

17. The non-transitory computer readable medium of claim 15, wherein the processing device is caused to display at least one frame in the second plurality of frames at a snippet transition for an extended period of time, wherein a last frame of the second plurality of frames in an interval between the respective frame and a next frame in the first plurality is displayed repeatedly for the extended period of time a subsequent snippet starting at the next frame in the first plurality is displayed.

18. The non-transitory computer readable medium of claim 15, wherein the processing device is further caused to:
identify a last snippet in the stream of video data; and
display the last snippet in the stream of video data.

19. The non-transitory computer readable medium of claim 15, wherein said first and second plurality of frames are created during an encoding of the stream of video data.

20. The non-transitory computer readable medium of claim 15, wherein said first and second plurality of frames are created during an encoding of the stream of video data.

* * * * *